Feb. 8, 1927.
B. B. McCANNON ET AL
1,617,067
DIRIGIBLE HEADLIGHT
Filed July 15, 1926
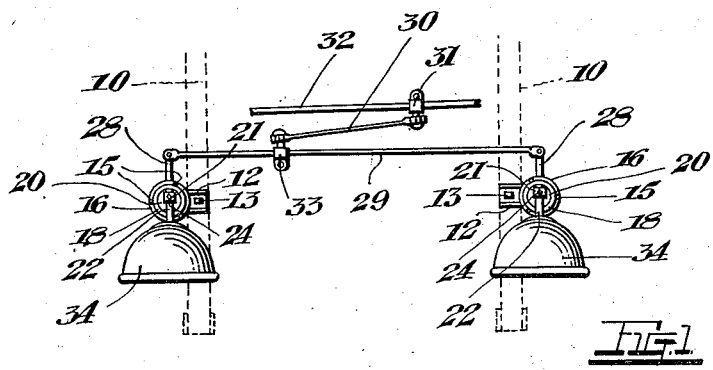
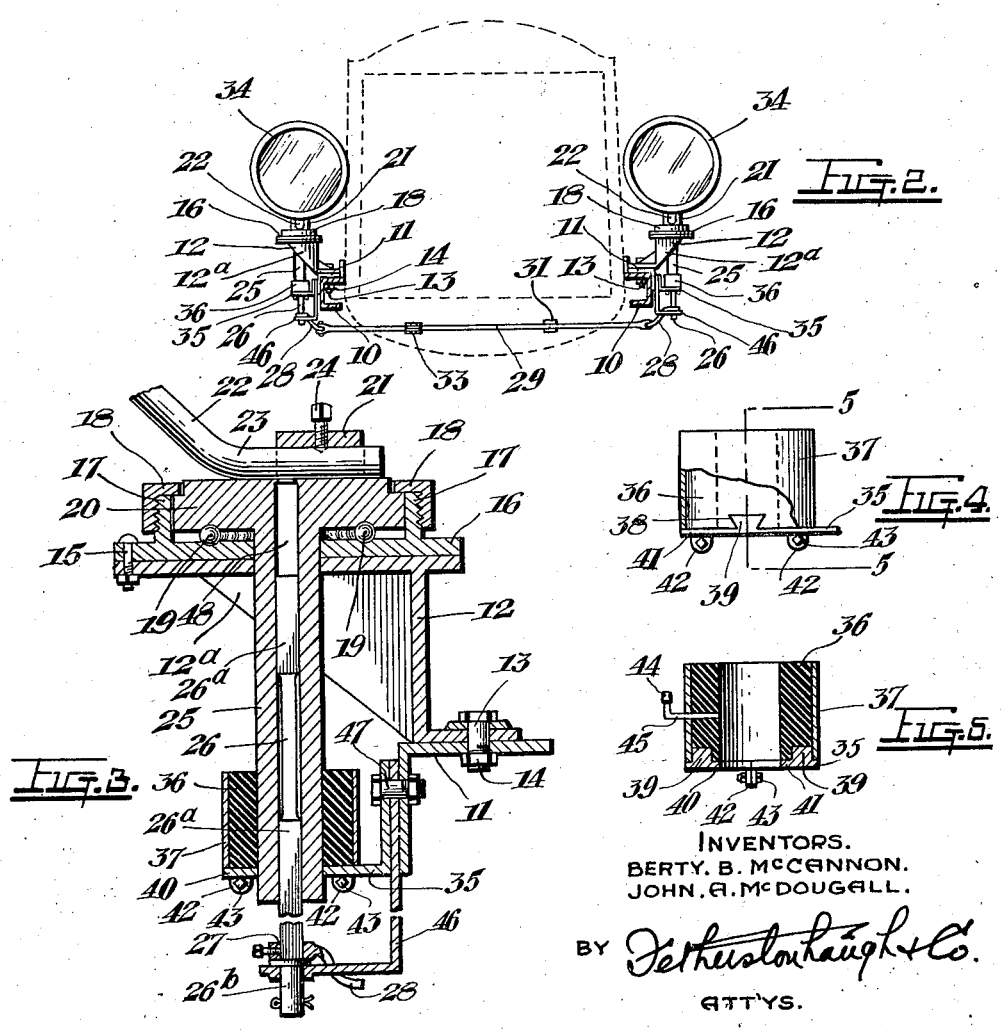
INVENTORS.
BERTY. B. McCANNON.
JOHN. A. McDOUGALL.
BY Fetherstonhaugh & Co.
ATT'YS.

Patented Feb. 8, 1927.

1,617,067

UNITED STATES PATENT OFFICE.

BERTY B. McCANNON AND JOHN ALEXANDER McDOUGALL, OF GRAND FORKS, BRITISH COLUMBIA, CANADA.

DIRIGIBLE HEADLIGHT.

Application filed July 15, 1926. Serial No. 122,706.

This invention relates to improvements in dirigible headlights for automobiles and the like and the objects of the invention are to enable headlights to be turned with the steering wheel.

Further objects are to provide a dirigible headlight of this description adapted to be operated simultaneously with the steering mechanism and comprising durable and simply constructed parts which will not be liable to get out of order and which are so arranged that the several functions required will be more satisfactorily performed.

With the foregoing and other objects in view the invention consists essentially in the combination with the steering mechanism and the headlights of means supported on the vehicle frame and operatively connected to the steering mechanism for rotatably carrying the headlights whereby, on the steering mechanism being operated, the headlights are simultaneously operated in the same direction to follow the direction in which the vehicle is travelling.

With the foregoing and other objects in view, reference is now had to the accompanying drawings in which like characters of reference indicate corresponding parts in each figure:

Figure 1 is a plan view of our improved device, the dotted lines showing the automobile frame, Figure 2 is a front elevation of the same, Figure 3 is an enlarged sectional detail of the lamp supporting bracket, Figure 4 is a sectional elevation of the stem support, and Figure 5 is a section on the line 5—5 of Fig. 4.

Referring now more particularly to the drawings, in which a preferred form of our device is illustrated, 10 designates the chassis or frame of the vehicle. On this frame 10 is mounted a bracket 11 on which, in turn, is mounted a lamp-supporting bracket 12, provided with angular, reinforcing, side webs 12ª, the two bracket members being bolted together to the frame 10 by a bolt 13 provided with a retaining nut 14. The lamp carrying bracket member 12 is rigid and has bolted thereto, as at 15, the bearing plate 16 formed with an externally screw-threaded collar 17 designed to engage with an internally threaded cap 18. Within the collar 17 and on suitable ball-bearings 19 on the plate 16, and, retained thereby said collar, is a circular platform member 20 on the top of which is provided a sleeve 21 to engage with the lamp carrying post 22 suitably bent as at 23 and adjustably clamped in position within the sleeve 21 by an adjusting screw 24. The platform member 20 is provided with a stem 25 extending through the plate 16 and the bracket 12 and in which is an operating rod member 26 with square portions 26ª and an annular portion 26ᵇ, whereby the stem 25, and with it the platform 20, are turnably operated. Adjustably and rigidly connected to the rods 26, as at 27, are links 28 in turn fixedly connected to one another by a cross rod 29 which, in turn, is operatively connected, by a rod 30 and a clamping member 31, to the steering rod 32, the opposite end of the rod 30 being connected by clamping member 33 to the rod 29.

It will thus be seen that, on the steering rod 32 being operated in one direction, it will cause a pull through the rod 30 on the rod 29 which, in turn, will cause the headlights 34 to turn or move in one direction concurrently with the front wheels and in the direction in which the vehicle is travelling.

A feature of our invention is the platform 16 provided with the stem 25 in combination with the bracket 12 and the means of securing said bracket simultaneously to the chassis and the radiator whereby vibration is practically eliminated.

As particularly illustrated in Figure 3 stability is provided for the stem 25 in the form of a bracket 35 upon which is mounted an annular member 36. This member may be made of rubber or the like and is provided with a ferrule 37. The base of the member 36 is provided with a dovetail recess 38 into which the dovetail 39 is adapted to fit.

For the purpose of convenience in assembling, the bracket 35 is formed in two sections 40 and 41 having integral therewith lugs 42, the sections being securely held by bolts 43 or the like.

Lubricating means are provided for the stem 25 in the form of a cup 44 and conduit 45. Means for supporting the lower end of the rod 26 are provided in the form of a further bracket member 46. This bracket may be bolted or otherwise secured, as at 47, between the members 11 and 35.

From the foregoing it will be seen that the stem 25 and rod 26 are not only rotatably supported but the rod 26 is slidably operable in the central bore 48 of the stem. The sliding portion will eliminate any adverse strain in the steering mechanism while the member 36 will tend to absorb shock due to the operation of the motor vehicle.

As many changes could be made in the above construction and many different embodiments of our invention, within the scope of the claim, constructed without departing from the spirit or scope thereof, it is intended that all matter contained in the present specification and accompanying drawings be interpreted in an illustrative and not in a limiting sense.

What we claim as our invention is:

In a device of the character described, the combination, with a headlight standard, of a rotatably mounted platform member provided with a stem having a bore therethrough, a bracket and a bearing plate on said bracket formed with a collar adapted to operatively engage with the platform and roller bearings between the platform and said plate and a cap for said collar and means formed in the platform for permitting the cap to engage with said collar.

In witness whereof we have hereunto set our hands.

BERTY B. McCANNON.
JOHN ALEXANDER McDOUGALL.